(12) United States Patent
Kobayashi et al.

(10) Patent No.: US 6,450,527 B2
(45) Date of Patent: Sep. 17, 2002

(54) PROTECTION BAG AND PROTECTION APPARATUS FOR PROTECTING HEAD OF AUTOMOBILE PASSENGER

(75) Inventors: Ichizo Kobayashi; Wataru Nakazawa, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/835,842

(22) Filed: Apr. 17, 2001

(30) Foreign Application Priority Data

| Apr. 21, 2000 | (JP) | 2000-121335 |
| Jun. 26, 2000 | (JP) | 2000-191450 |
| Jul. 21, 2000 | (JP) | 2000-220882 |
| Oct. 3, 2000 | (JP) | 2000-303799 |
| Feb. 28, 2001 | (JP) | 2001-054841 |

(51) Int. Cl.$^7$ .................... B60R 21/22; B60R 21/24
(52) U.S. Cl. ............................... 280/729; 280/730.2
(58) Field of Search ............... 280/729, 730.2, 280/730.1, 743.1

(56) References Cited

U.S. PATENT DOCUMENTS

| 6,010,149 | A | * | 1/2000 | Riedel et al. | 280/729 |
| 6,168,191 | B1 | * | 1/2001 | Webber et al. | 280/730.2 |
| 6,176,514 | B1 | * | 1/2001 | Einsiedel | 280/730.2 |
| 6,199,898 | B1 | * | 3/2001 | Masuda et al. | 280/729 |
| 6,220,625 | B1 | * | 4/2001 | Wallner et al. | 280/729 |
| 6,237,937 | B1 | * | 5/2001 | Kokeguchi et al. | 280/730.2 |
| 6,250,667 | B1 | * | 6/2001 | Wallner | 280/729 |
| 6,254,123 | B1 | * | 7/2001 | Urushi et al. | 280/730.2 |
| 6,293,581 | B1 | * | 9/2001 | Saita et al. | 280/730.2 |

FOREIGN PATENT DOCUMENTS

| JP | 11-48903 | * | 2/1999 |
| JP | 11-91492 | * | 4/1999 |

* cited by examiner

*Primary Examiner*—Peter C. English
(74) *Attorney, Agent, or Firm*—Kanesaka & Takeuchi

(57) ABSTRACT

A protection bag for an automobile includes an introducing chamber extending along an upper side of the bag, and a plurality of small chambers disposed parallel to each other at a lower side of the introducing chamber. Some of the small chambers have a spiral shape. Gas inlet of the spiral small chamber faces a pass through port. The length of a gas flowing path of the small chamber is greater than the width of the small chamber. The protection bag can avoid outflow of gas from the small chambers and sufficiently absorb the impact on the passenger's head.

11 Claims, 11 Drawing Sheets

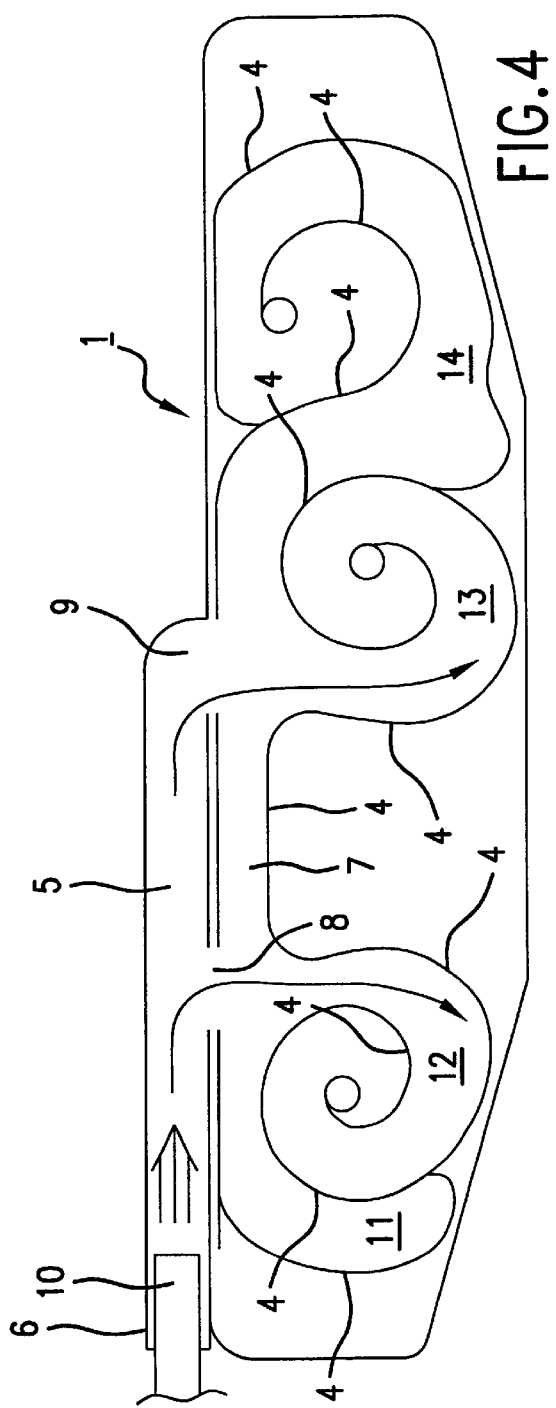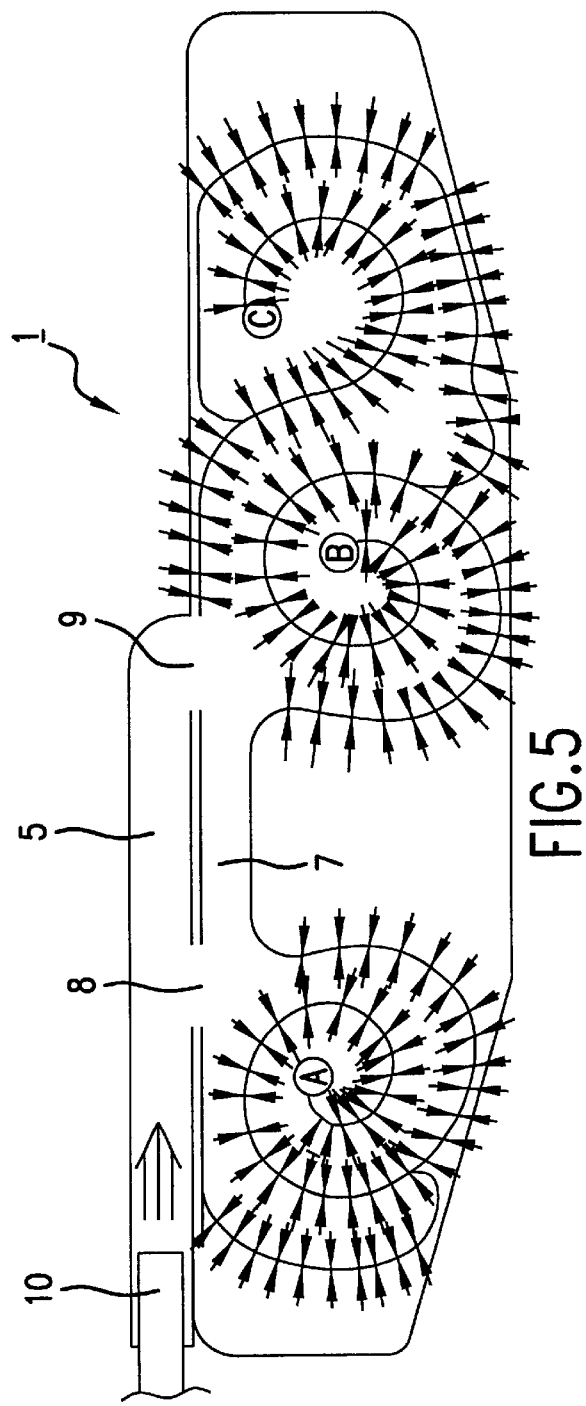

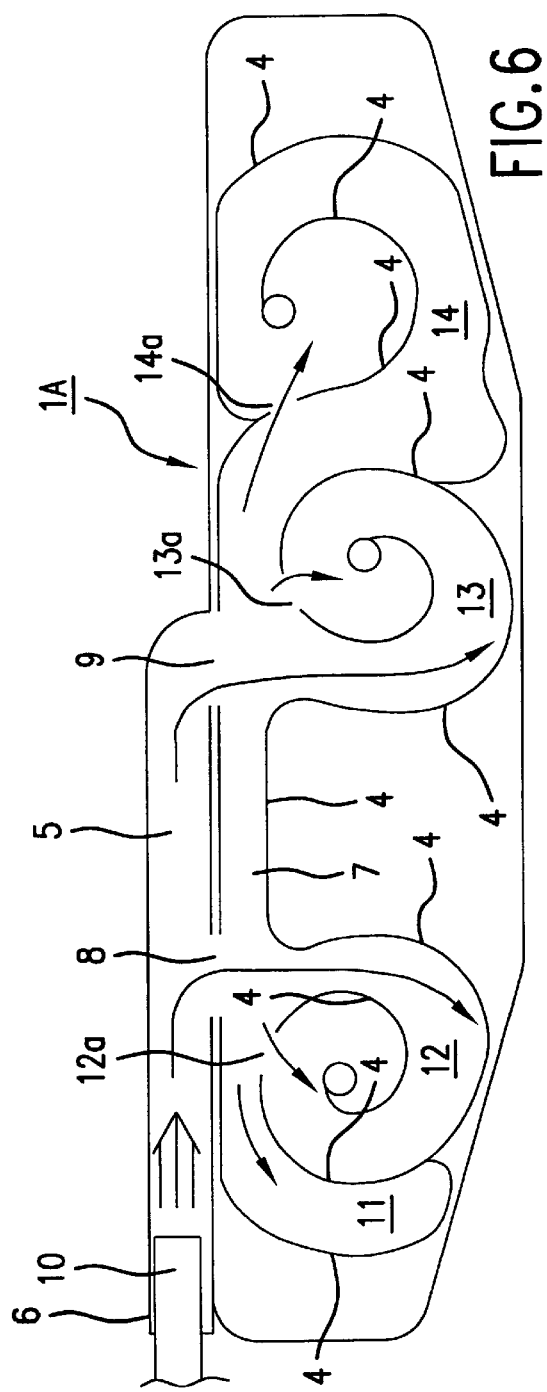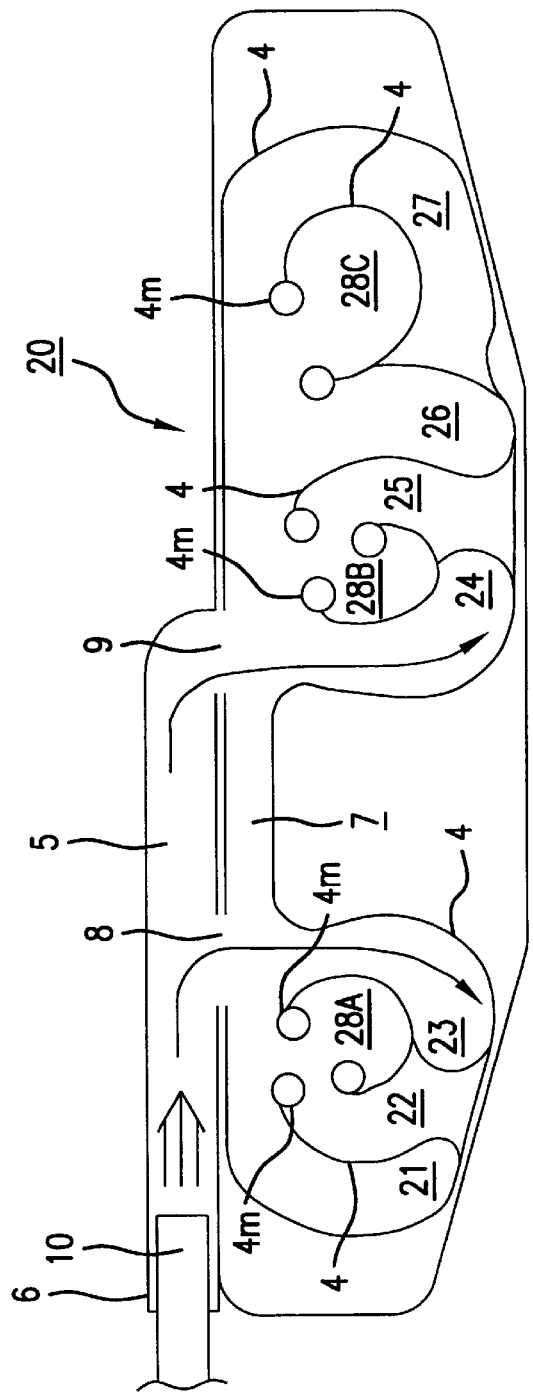

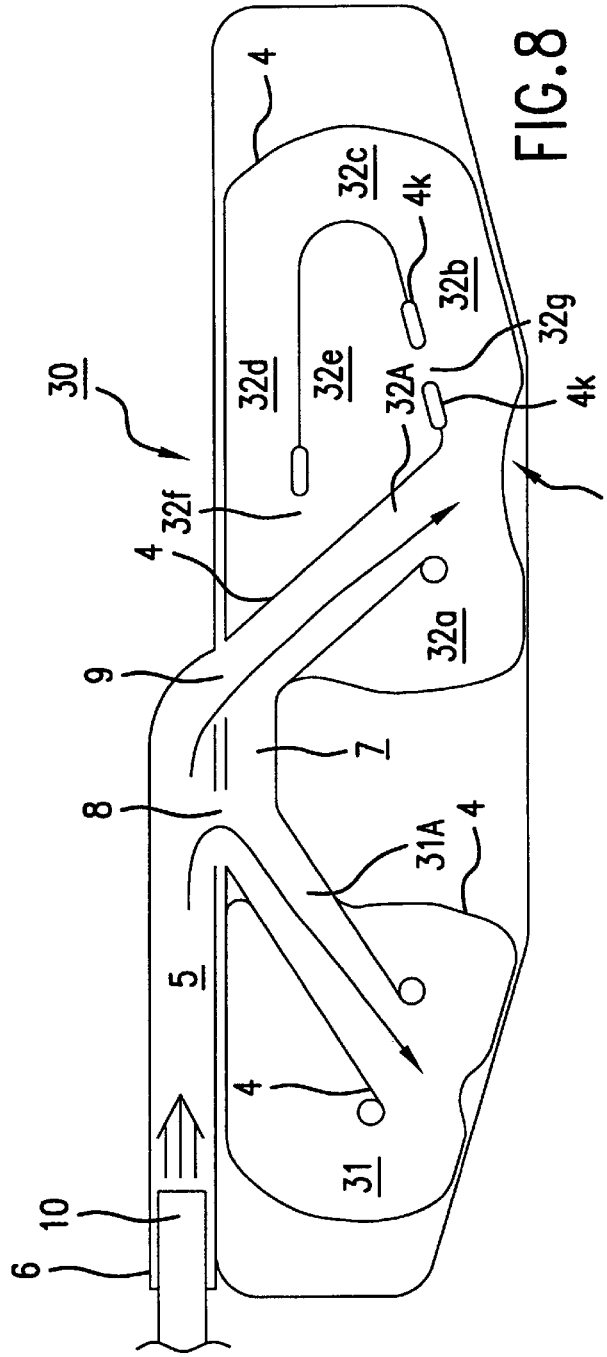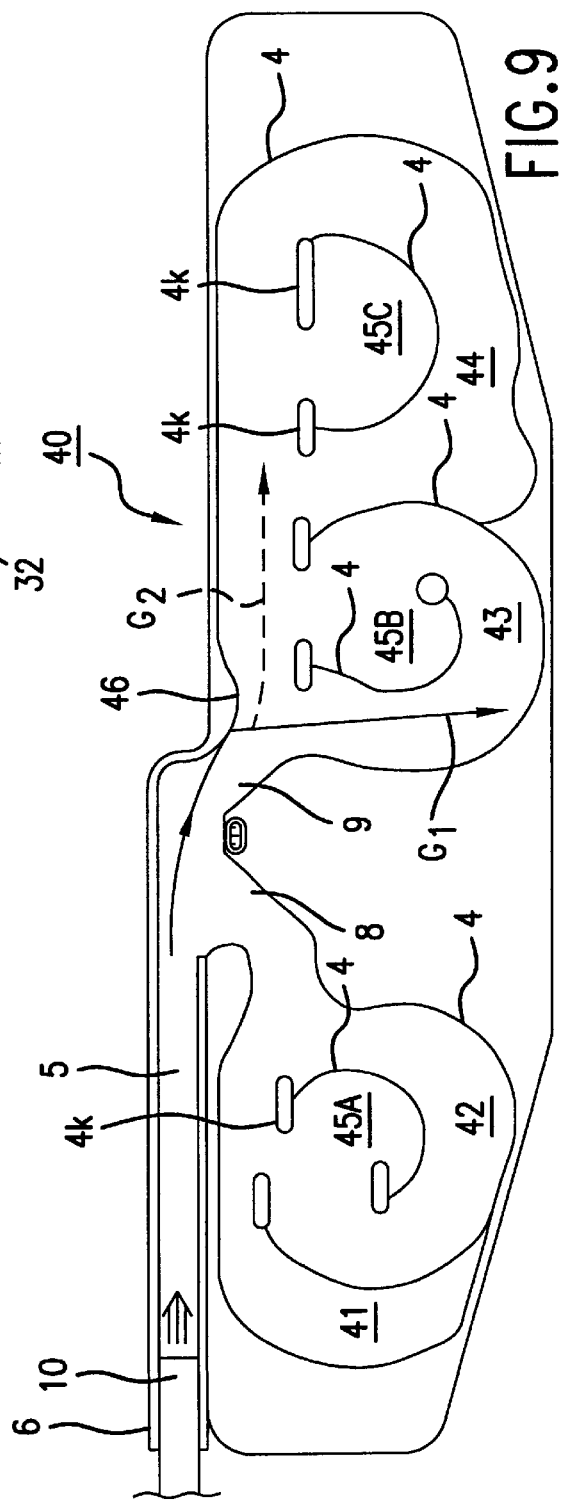

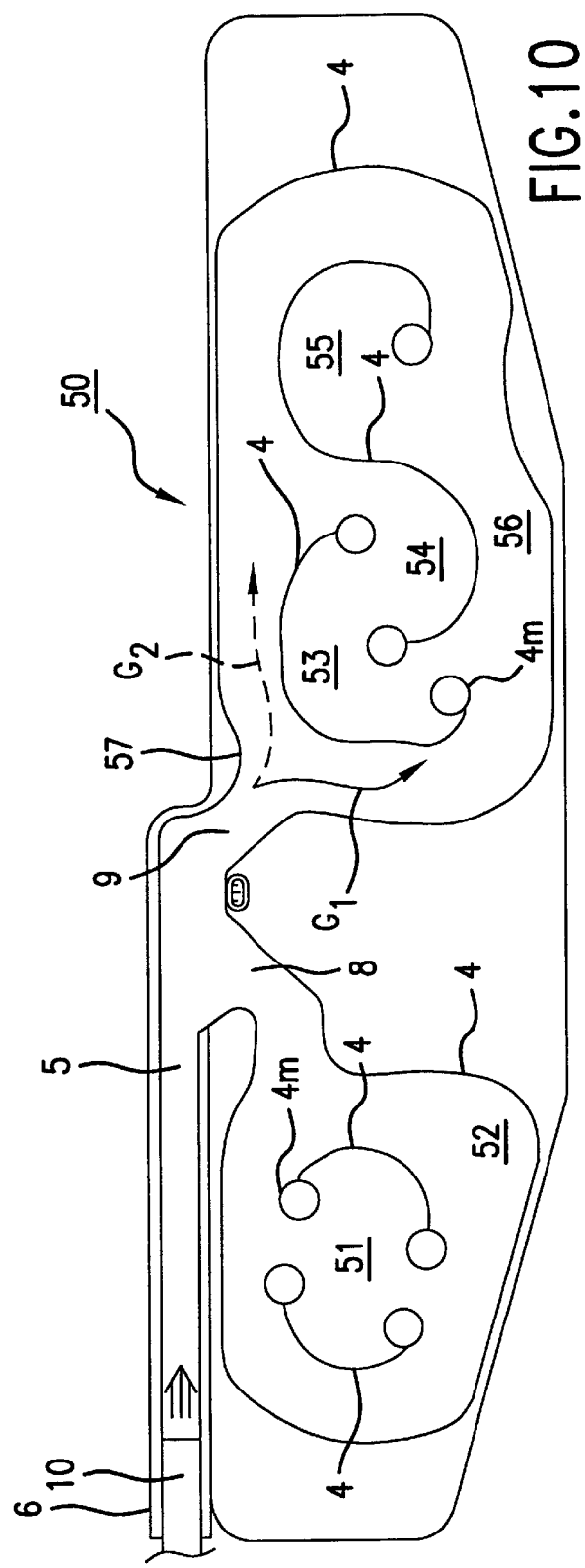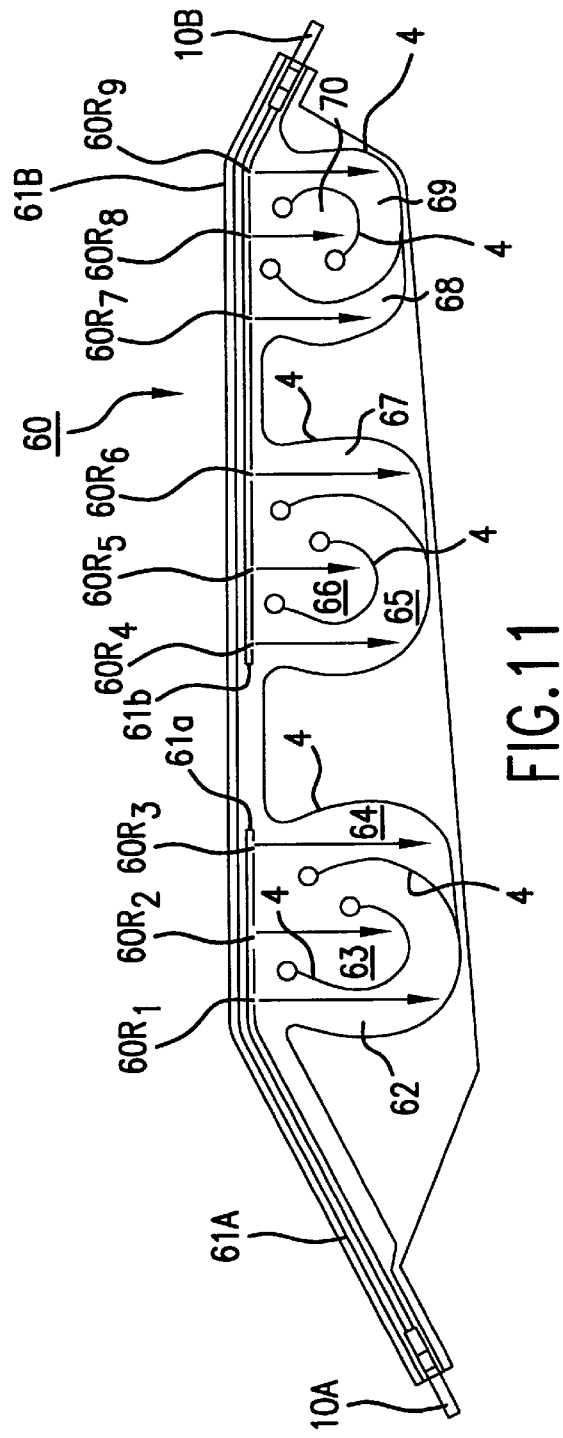

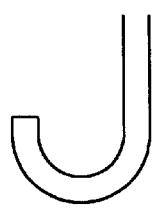 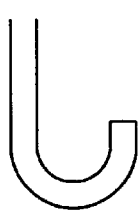 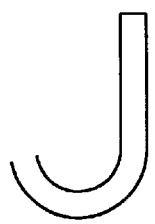 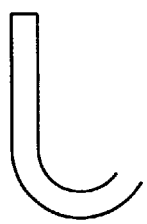
FIG.12(a)　　FIG.12(b)　　FIG.12(c)　　FIG.12(d)
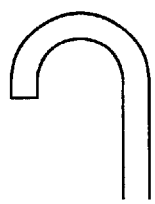 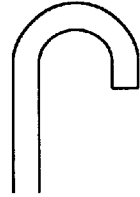 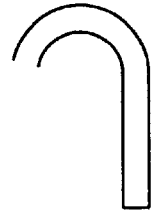 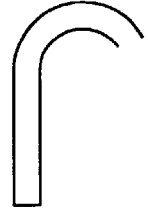
FIG.12(e)　　FIG.12(f)　　FIG.12(g)　　FIG.12(h)
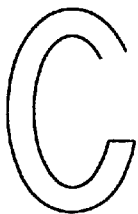   
FIG.13(a)　　FIG.13(b)　　FIG.13(c)　　FIG.13(d)
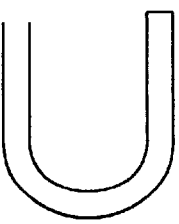 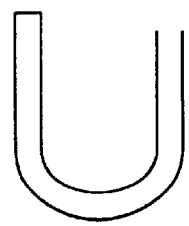 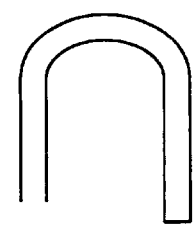 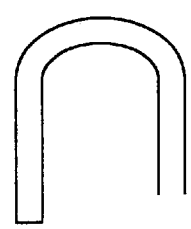
FIG.14(a)　　FIG.14(b)　　FIG.14(c)　　FIG.14(d)

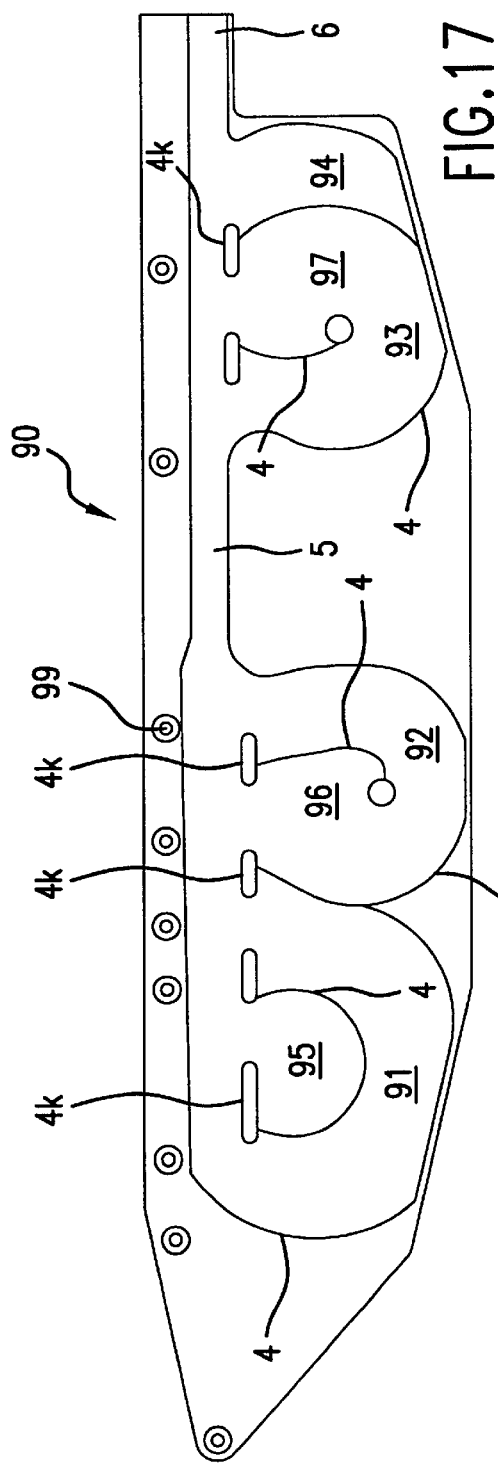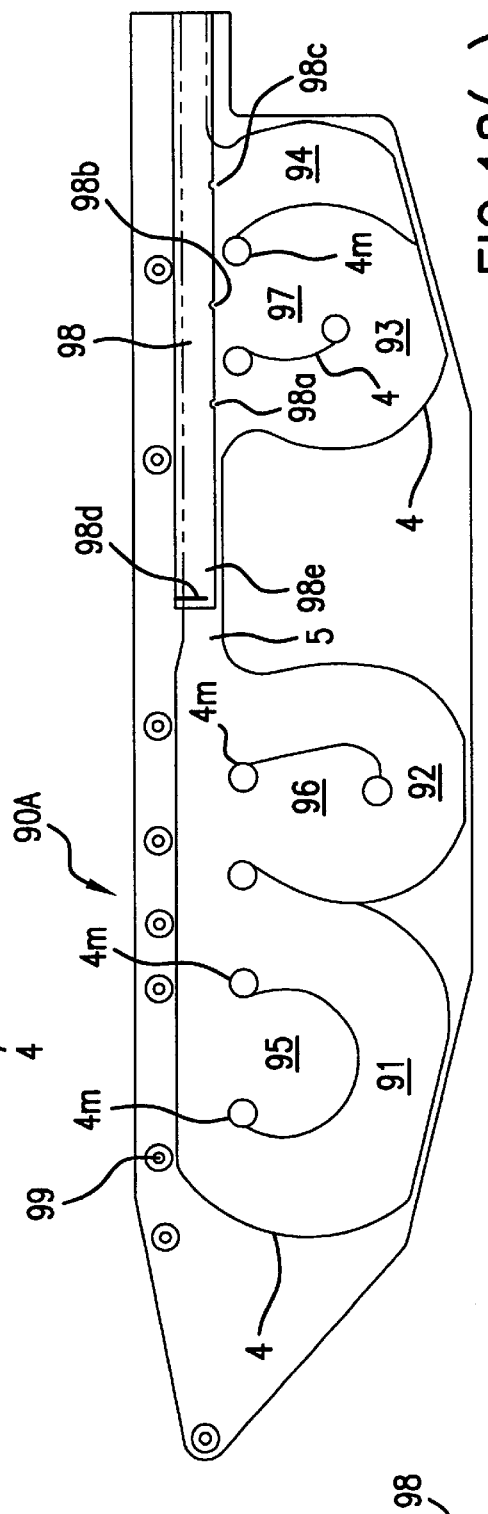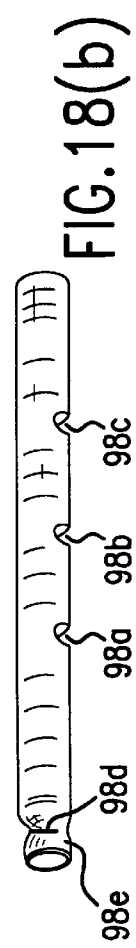

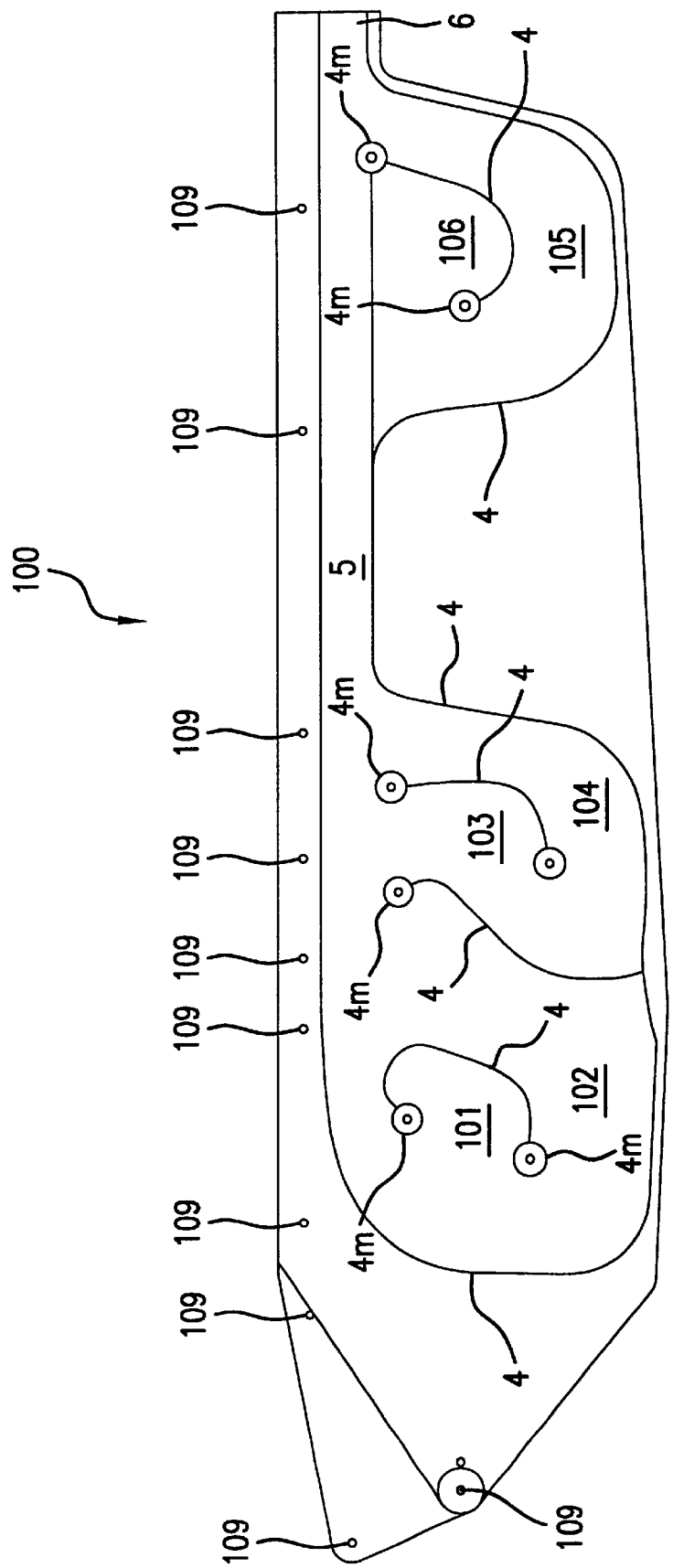

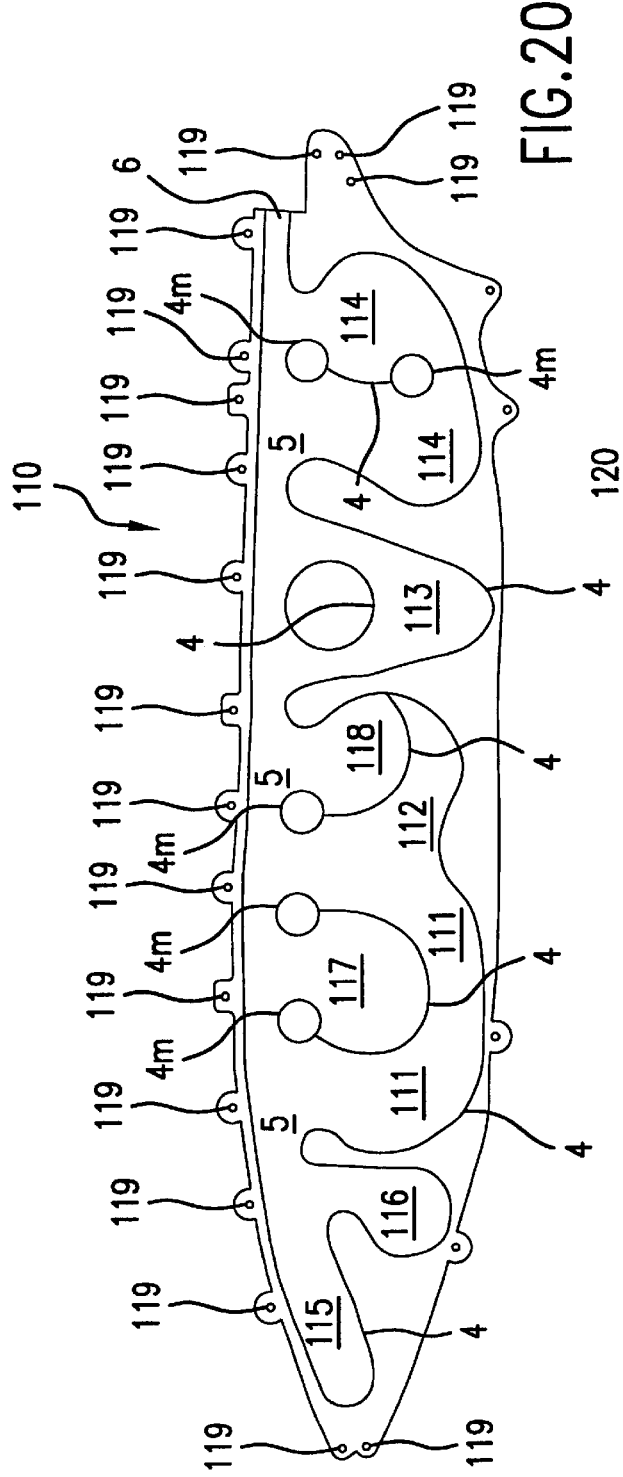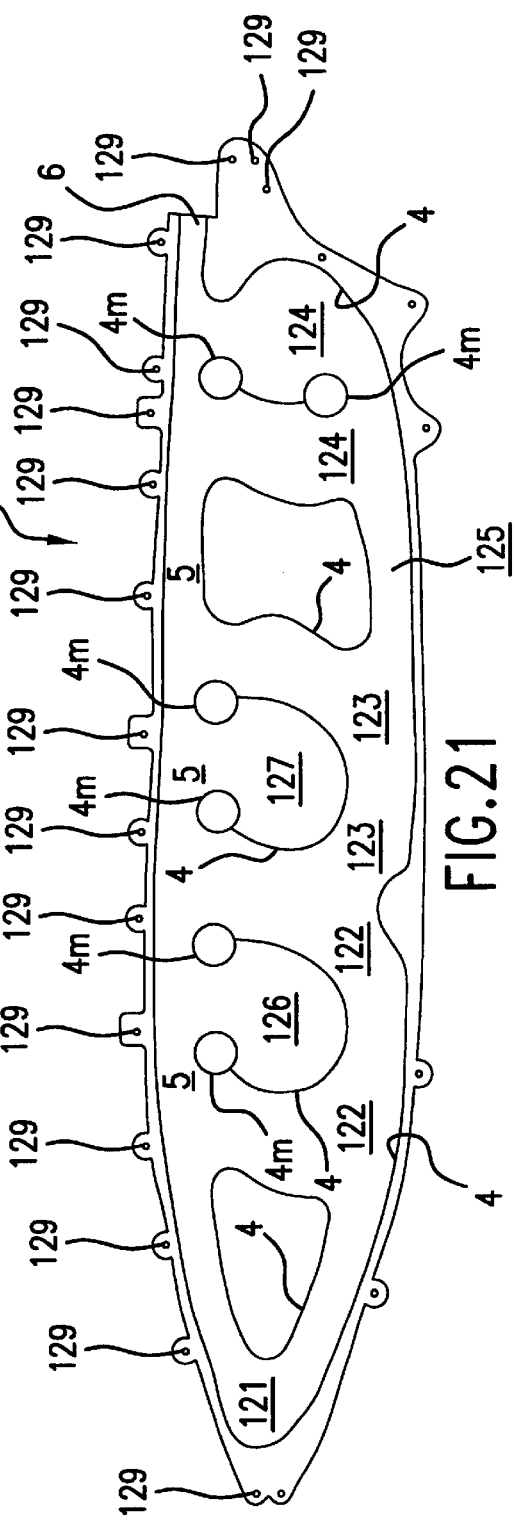

PROTECTION BAG AND PROTECTION APPARATUS FOR PROTECTING HEAD OF AUTOMOBILE PASSENGER

BACKGROUND OF THE INVENTION AND RELATED ART STATEMENT

The present invention relates to a protection bag, so-called "curtain bag", for protecting a head of an automobile passenger. In particular, the present invention relates to a bag which inflates along a window in a side door when an automobile collides at a side thereof or turns over sideways. The present invention also relates to a protection apparatus for protecting a head of an automobile passenger by using the protection bag.

A curtain bag of this type, i.e. a protection bag for protecting a head of an automobile passenger, is disclosed in, for example, WO96/26087 in which a chamber unit includes a duct extending along an upper side of the bag from the front side of the automobile (front end) to the rear side of the automobile (rear end), and a number of cells or small chambers extending downward from the duct parallel to each other, each communicating with the duct.

In the bag which includes a number of small chambers extending downward parallel to each other, as the above known bag, a phenomenon occurs such that the bag expands while forming a vertically bent shape, i.e. V-shape in a longitudinal section, at the beginning of the expansion immediately after gas is introduced. In case small chambers, i.e. cells, which inflate first, are positioned toward an upper part of the bag according to the shape of a sewing line of the bag, a lower portion of the bag is bent to the inner side with respect to the restricting sewing line so as to form a V-shape in a longitudinal section. In case a large number of sewing lines in the transverse direction or ends of the sewing lines are positioned at an intermediate portion between the upper and lower edges of the bag, the bag is bent in a V-shape at the intermediate portion.

Due to the phenomenon in which the bag is bent in a V-shape (hereinafter referred to as a "folding phenomenon"), complete downward extension of the lower end of the bag is delayed.

Generally, since the gas flows straight in a duct at a predetermined speed while thermally expanding, the gas tends to flow straight rather than changing the direction quickly to flow at a right angle toward the small chambers in the known curtain bag in which the relatively long small chambers extend downward from the duct in a direction perpendicular to the duct. The gas which flows straight rebounds when it collides against a sealed end of the duct. The rebounding gas collides with the straight flowing gas, so that the speed of the flowing gas is set off, thereby reducing the initial speed of the gas. Due to internal pressure rise in the vicinity of the collision, the gas tends to flow toward a portion where the pressure is low, that is, toward the small chambers, so that the direction of flow of the gas changes at a right angle. In the known curtain bag in which the direction of flow of the gas reduced in pressure by the collision is changed at a right angle when the gas flows into the small chambers, the efficiency of inflation of the bag is low because of the significant loss in the speed of the gas.

It is a first object of the present invention to provide a protection bag for a head of an automobile passenger, in which the bag remains in an inflated state for a long time after being inflated.

It is a second object of the present invention to provide a curtain bag, wherein an ability of expanding quickly is improved.

It is a third object of the present invention to provide a curtain bag which has a high energy absorbing effect of absorbing collision energy generated when the passenger's head collides with the curtain bag.

SUMMARY OF THE INVENTION

According to a first aspect of the present invention, a protection bag for protecting a head of an automobile passenger is disposed in the vicinity of a corner between a ceiling and a side face of an automobile. The bag inflates downward along the side face as gas is introduced, and is formed of a plurality of small chambers in the bag, wherein at least one of the small chambers is bent or curved in a direction of flow of the gas.

The small chamber which is bent may include a gas inlet at one end, or alternatively, at one end and at the other end of the small chamber, and the direction of flow of the gas may be defined as a central line connecting the one end and the other end through the intermediate points in the lateral direction of the small chamber. The length of the central line connecting the one end and the other end is preferably greater than a maximum width in a direction perpendicular to the central line or the tangent to the central line.

The width in a direction perpendicular to the central line is defined as a width of the bag, when it is not inflated and spread in a plane.

The small chamber which is bent in a direction of flow of the gas is preferably bent or cured, for example, into a J-shape, a C-shape, or an S-shape.

In the bag or curtain bag, the gas is not likely to return to the gas inlet side from the small chamber when the passenger's head collides with the inflated bag, so that the gas is not likely to flow out from the small chamber, thereby sufficiently absorbing the impact.

When the direction of flow of the gas is gradually changed so as not to reduce the speed of flow of the gas by disposing the small chamber which is elongated in the direction of flow of the gas and is curved so as not to be sharply bent, the loss of the speed of flow of the gas is reduced, and the gas flows through the small chamber at a high speed. Thus, the curtain bag has a high ability of quickly expanding.

Particularly, it is significantly efficient when the small chamber is formed in a spiral form.

That is, when the small chamber is formed in a spiral form, the length in a direction of flow of the gas of the small chamber can be made long, thereby increasing the volume of gas which can be introduced into the small chamber. Therefore, the volume of gas which moves when the passenger's head collides with the small chamber is increased, so that a high energy-absorbing (hereinafter abbreviated to "EA") effect can be obtained. When the small chamber is formed in the spiral form, the tensile forces to be applied to a sewing line is generated at an angle of 360°. Thus, the tensile forces can be distributed to sections of a wide range in the bag, and a high EA effect is obtained. When the passenger's head collides with the spiral-shaped small chamber, gas-flowing path elongated in a direction of flow of the gas is closed by pressing the small chamber at a plurality of portions thereof, thereby narrowing the gas outlet, so that the gas is not likely to flow out. Therefore, it is significantly efficient as a high EA effect is obtainable.

According to the first aspect of the present invention, at least one of the small chambers which is bent or curved in a direction of flow of the gas may include an extending member which is disposed so as to extend in the longitudinal direction of the automobile. Since the extending or elongated member is not likely to be bent at a vertically intermediate portion thereof, the passenger's head is efficiently held so as to be protected from the impact from the inside of the automobile, by the extending member which is supported by two pillars when the passenger collides with the extending member at the head.

According to a second aspect of the present invention, a protection bag for protecting a head of an automobile-passenger is disposed in the vicinity of a corner between a ceiling and a side face of an automobile, and inflates downward along the side face as gas is introduced. The protection bag comprises a plurality of small chambers in the bag, wherein at least one of the small chambers is provided with a gas inlet which is positioned at an upper part of the bag, the small chamber continuing from the gas inlet to a lower side of the bag.

In the protection bag for protecting a head of an automobile passenger, a gas-introducing chamber is preferably provided to extend along an upper side of the bag, and a gas outlet provided in the gas-introducing chamber is preferably disposed so that the gas outlet faces the gas inlet of the small chamber. In particular, the gas inlet is preferably connected directly to the gas outlet.

The cross-sectional area of a gas-flowing path connected to the gas inlet of each small chamber is preferably set so that the speed of expansion of the small chamber is substantially the same as that of the other. With this arrangement, each small chamber inflates so as to expand substantially simultaneously with the other, whereby a bag is well balanced in the timing of expansion.

The protection bag, according to the present invention, may further comprise a duct provided along an upper side of the bag, through which the gas from an inflator flows, for distributing the gas between the small chambers. The duct may be provided with a bent part which is bent downward in the middle of the duct.

In the protection bag for protecting a head of an automobile passenger, a portion of the gas flows from the bent part toward the lower side of the bag. With the gas flowing to the lower end of the bag, the bag quickly expands downward without being folded.

In this case, at least one gas inlet of the small chamber is preferably disposed in the vicinity of the bent part. With this arrangement, the gas, the direction of which changes downward at the bent part, is likely to flow directly into the small chamber.

A protection apparatus for protecting a head of an automobile passenger according to the present invention comprises the protection bag thus arranged and a gas generator for supplying the gas into the protection bag.

BRIEF DESCRIPTION OF THE DRAWINGS

FIG. 4 is a sectional view taken along line 4—4 in FIG. 2;

FIG. 5 is an illustration showing the operation of the bag shown in FIGS. 1 to 4;

FIG. 6 is a sectional view of a protection bag for a head of an automobile passenger according to another embodiment;

FIG. 7 is a sectional view of a protection bag for a head of an automobile passenger according to still another embodiment;

FIG. 8 is a sectional view of a protection bag for a head of an automobile passenger according to yet another embodiment;

FIG. 9 is a sectional view of a protection bag for a head of an automobile passenger according to a further embodiment;

FIG. 10 is a sectional view of a protection bag for a head of an automobile passenger according to a still further embodiment;

FIG. 11 is a sectional view of a protection bag for a head of an automobile passenger according to a yet further embodiment;

FIGS. 12(a)–12(h) are schematic views of J-shaped small chambers;

FIGS. 13(a)–13(d) are schematic views of C-shaped small chambers;

FIGS. 14(a)–14(d) are schematic views of U-shaped small chambers;

FIG. 17 is a sectional view of a protection bag for a head of an automobile passenger according to a still further embodiment;

FIG. 18(a) is a sectional view of a protection bag for a head of an automobile passenger according to a still further embodiment, and FIG. 18(b) is a perspective view of a hose;

FIG. 19 is a sectional view of a protection bag for a head of an automobile passenger according to a still further embodiment;

FIG. 20 is a sectional view of a protection bag for a head of an automobile passenger according to a still further embodiment; and FIG. 21 is a sectional view of a protection bag for a head of an automobile passenger according to a yet further embodiment.

DETAILED DESCRIPTION OF PREFERRED EMBODIMENTS

Figure 1:
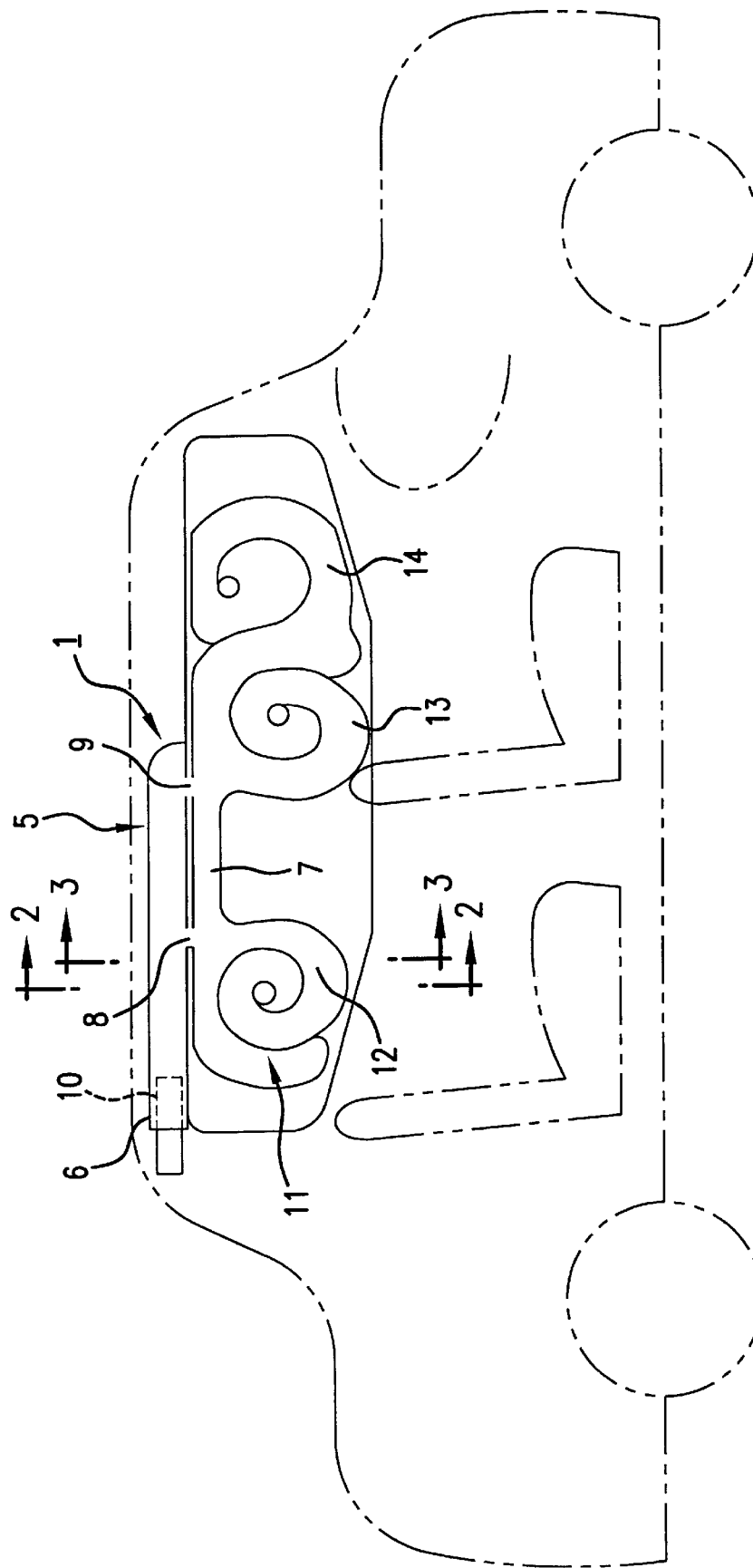
FIG. 1 is a front view of a bag according to an embodiment.
Figure 2:
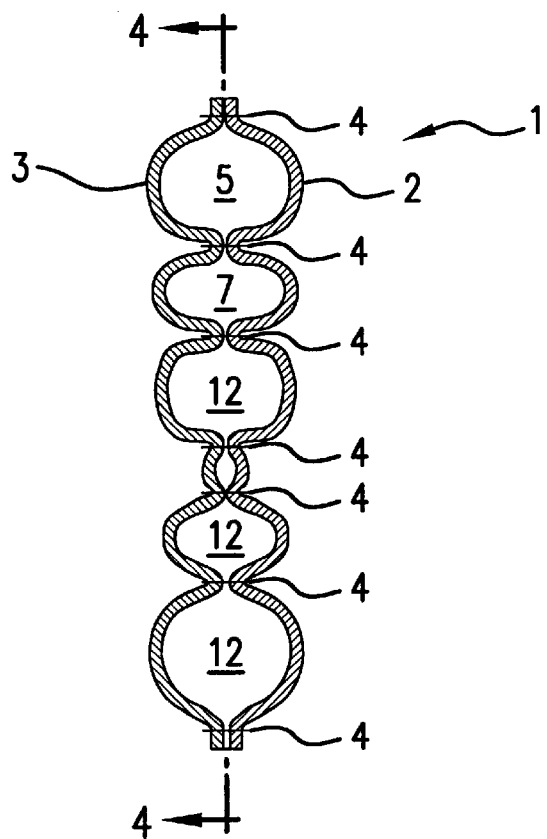
FIG. 2 is a sectional view taken along line 2—2 in FIG. 1.
Figure 3:
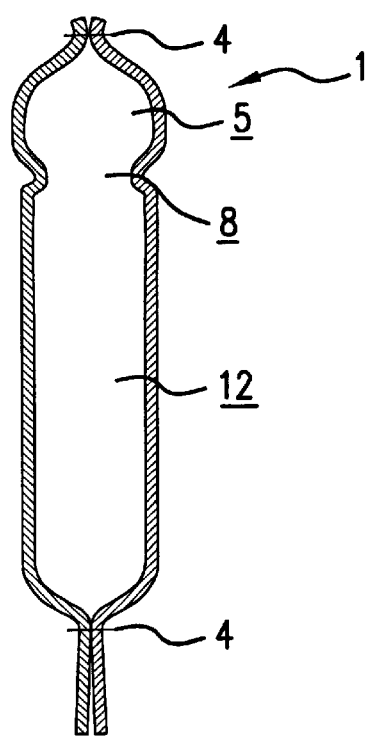
FIG. 3 is a sectional view taken along line 3—3 in FIG. 1.
Figure 15A:
FIGS. 15(a)–15(h) are schematic views of S-shaped small chambers.
Figure 15B:
Figure 15C:
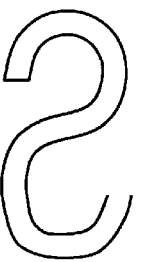
Figure 15D:
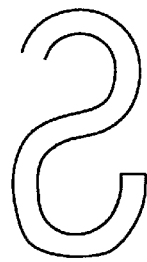
Figure 15E:
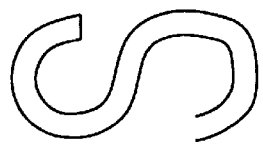
Figure 15F:
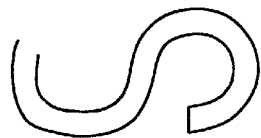
Figure 15G:
Figure 15H:
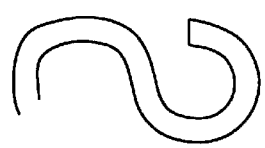

Preferred embodiments according to the present invention are described below with reference to the drawings. FIG. 1 is a front view of a protection bag according to a first embodiment of the present invention. FIGS. 2 and 3 are sectional views of the protection bag taken along line 2—2 and line 3—3, respectively, in FIG. 1. FIG. 4 is a sectional view taken along line 4—4 in FIG. 2.

A protection bag 1 is formed such that a passenger-side sheet 2 and an automobile-body-side sheet 3 overlapping each other are sewed or connected with each other by a sewing thread 4, thereby forming chambers between the sheets 2 and 3. The connection may be performed by bonding, welding, or the like instead of sewing by the sewing thread 4.

A duct 5 extends from an intermediate part between the front and rear ends of the bag 1 to the rear end thereof, and the duct 5 is connected to an inflator 10 disposed in a C-pillar or the like of the automobile. The duct 5 extends along a roof side-rail, and is provided with a gas intake 6 at the rear end of the duct 5. The inflator 10 provides gas when the automobile collides or falls sideways.

The chamber in the bag 1 includes an introducing chamber 7 extending from the vicinity of the front end of the bag 1 to the vicinity of the rear end thereof, and a plurality of small chambers 11, 12, 13 and 14 which are disposed below the introducing chamber 7. The introducing chamber 7 and the duct 5 communicate with each other via a plurality (two in the present embodiment) of pass-through ports 8 and 9.

The pass-through port 9 is positioned at a longitudinally intermediate part of the bag 1, and the pass-through port 8 is positioned at the rear side of the pass-through port 9.

The sheets 2 and 3 are connected to each other by the sewing thread 4 so as to form the small chambers 11 to 14. The connection may be performed by seaming, bonding or welding.

The small chambers 12 and 13 are formed in a spiral shape, and gas inlets thereof oppose the pass-through ports 8 and 9, respectively. The respective central lines in the small chambers 12 and 13 are spiral. The small chamber 11 is disposed at the rear side of the bag 1 and is formed in an arc shape so as to surround approximately half around the small chamber 12. The central line in the small chamber 11 is substantially C-shaped.

The small chamber 14 and its central line are substantially S-shaped in a half thereof in the vicinity of a gas-intake part of the chamber 14 and is spiral in the other half. The small chamber 14 is positioned at the front end of the bag 1 adjacent the small chamber 13.

The small chambers 11 to 14 are formed so that the lengths in the gas-flowing direction of the respective small chambers 11 to 14 are greater than the respective widths thereof. That is, the lengths of the respective small chambers 11 to 14 from ends at the gas-intake parts thereof to the other ends are greater than respective maximum widths of the small chambers 11 to 14 in the directions perpendicular to the central lines of the respective small chambers 11 to 14 or to the tangents to the respective central lines.

The small chambers 11 to 14 are positioned so that the respective gas-intake parts thereof are disposed at the upper part of the bag 1, and the small chambers 11 to 14 extend downward to the lower side of the bag 1.

The protection bag 1 thus formed is folded and is received in a case (not shown). The case is formed, for example, in a box which extends along a roof side-member of the automobile. At least one part of a side of the case disposed in the compartment can open toward the compartment. When gas is supplied by the inflator 10 into the bag 1, the part of the side of the case opens by being pressed by the bag 1 which expands, whereby the bag 1 inflates and is exposed in the compartment.

Since the length of the center line of each of the small chambers 11 to 14 is greater than the width in the direction perpendicular to the center line of each of the small chambers 11 to 14, and the small chambers 12, 13 and 14 are each formed in a spiral form toward the end thereof, the gas in each of the small chambers 12 to 14 is not likely to return toward the introducing chamber 7 when the bag 1 inflates and the passenger's head collides against the bag 1. Therefore, the passenger's head is surely received by the bag 1, thereby sufficiently absorbing the impact.

As shown in FIG. 5, when the bag 1 shown in FIGS. 1 to 4 inflates, substantially centripetal forces are individually generated toward centripetal points A, B and C of the spiral small chambers 12, 13 and 14, respectively. A large number of arrows shown in FIG. 5 represent tensile forces generated along the sewing lines when filling the bag 1 with gas. As shown in FIG. 5, the tensile forces are distributed in a spiral fashion more densely toward the respective centripetal points A, B and C, whereby tension can be generated in an angle of 360° around each centripetal point A, B or C. Moreover, a plurality of lines is disposed to overlap each other, so that strong tensile forces are generated at an angle of 360° by a synergistic effect caused by the interacting tensile forces.

Since the strongest tensile forces are generated at the centripetal points A, B, C, as described above, a strong binding force can be maintained by disposing the centripetal points A, B, and C slightly offset from positions at which the passenger's head is most likely to collide. The centripetal points A, B, C are better to be slightly offset because the amount of gas is small at the centripetal points A, B, and C at which the sewing lines are densely disposed.

A gas flowing path of each spiral small chamber 12, 13 or 14 is long, so that it is likely to take a long time for the whole small chambers to sufficiently inflate. Therefore, as in a protection bag 1A shown in FIG. 6, gas inlets 12a, 13a and 14a for connecting by short-cutting between the introducing chamber 7 and the small chambers 12, 13 and 14, respectively, may be provided in innermost portions (at the ends of the flowing paths) of the spiral small chambers 12, 13 and 14, respectively, and in the portions at which the introducing chamber 7 and each small chambers 12, 13 or 14 are separated by a sewing line in the vicinity of the pass-through port 8 or 9 of the introducing chamber 7.

FIGS. 7 and 8 are partial-sectional views of the protection bags 20 and 30, respectively, according to other embodiments, respectively. The drawings show components corresponding to those shown in FIG. 4.

The bag 20 shown in FIG. 7 includes small chambers 21, 22, 23, 24, 25 and 26 which are bent or curved substantially in a C-shape, a small chamber 27 which is bent or curved in a J-shape, and small chambers 28A, 28B and 28C which are not bent. The small chambers 21 to 27 are bent substantially in an arc shape. Particularly, the small chamber 27 is bent substantially in an elongated C-shape.

The length of a gas flowing path or a center line of each of the small chambers 21 to 27 is greater than a maximum width in a direction perpendicular to the center line of each of the small chambers 21 to 27. The small chambers 21 to 27 individually communicate with the introducing chamber 7 at respective upper parts of the small chambers 21 to 27, and extend to a lower side of the bag 20. Each of the small chambers 23 and 24 is disposed close to the pass-through port 8 or 9, respectively, and downward extends from the pass-through port 8 or 9 while being bent relatively gently to have a large radius of curvature, whereby the small chambers 23 and 24 inflate quickly and smoothly toward the lower ends thereof as compared with the other small chambers.

The small chambers 28A, 28B and 28C which are not bent also individually communicate with the introducing chamber 7 at the respective upper portions of the small chambers 28A, 28B and 28C.

In FIG. 7 (and in FIGS. 10, 11, 16, 18, 19, 20 and 21 described below), sewing threads 4 individually form circular sewing lines 4m at respective inlets of the small chambers. In FIGS. 8, 9 and 17 described below, the sewing threads 4 individually form rectangular sewing lines 4k at the respective inlets of the small chambers. The sewing lines 4m and 4k serve to avoid concentration of a stress. Each inlet having the circular sewing line 4m can be made larger than the inlet having the rectangular sewing line 4k.

The other configuration of the bag 20 is the same as that of the bag 1. The same components are referred to by using the same reference numerals.

In the bag 20, gas is not likely to flow out from the small chambers, so that the impact on the passenger's head can be sufficiently absorbed.

The bag 30 shown in FIG. 8 includes small chambers 31 and 32. The small chamber 31 includes an inclined duct 31A which communicates with the pass-through port 8 at the upper part of the inclined duct 31A. The inclined duct 31A extends downward toward the rear side of the bag 30, and opens at the lower part thereof in a lower portion of the small chamber 31. The small chamber 31 has a size capable of expanding between lower and upper sides of a rear portion of the bag 30.

The small chamber 32 includes an inclined duct 32A which communicates with the pass-through port 9 at the upper part of the inclined duct 32A. The inclined duct 32A extends downward toward the front side of the bag 30, and opens at the lower part thereof in a lower portion of the small chamber 32.

The small chamber 32 includes a section 32a disposed at a rear side of the bag 30 relative to the inclined duct 32A, a section 32b extending from the lower part of the inclined duct 32A toward the front side of the bag 30 along the lower side thereof, a section 32c rising from the front end of the section 32b, a section 32d extending from the upper end of the section 32c toward the rear side of the bag 30, and a section 32e disposed between the section 32d and the section 32b. The section 32e communicates with the section 32d via a pass-through port 32f and the section 32b via a pass-through port 32g. The sections 32b, 32c and 32d are connected to each other so as to be formed substantially in a C-shape.

The other configuration of the bag 30 shown in FIG. 8 is the same as that of the bag 1. The same components are referred to by using the same reference numerals.

In the bag 30 thus formed, gas is not likely to be discharged from the bent small chambers, thereby sufficiently absorbing the impact on the passenger's head.

The gas from the pass-through ports 8 and 9 is introduced directly to the lower portions of the small chambers 31 and 32, respectively, through the inclined ducts 31A and 32A, and the small chambers 31 and 32 start to inflate from the respective lower portions. Therefore, the bag 30 does not bend at a vertically intermediate part thereof during the inflation, and the overall bag 30 inflates evenly and quickly.

FIGS. 9 and 10 are partial-sectional views of protection bags 40 and 50, respectively, according to other embodiments. The drawings show components corresponding to those shown in FIG. 4.

The bag 40 shown in FIG. 9 includes small chambers 41, 42, 43 and 44 which are bent or curved and small chambers 45A, 45B and 45C which are not bent. The small chambers 41 to 44 are individually bent substantially in an elongated C-shape. The small chamber 44 is disposed so as to surround the small chamber 45C.

The length of a gas flowing path at a central line of each of the small chambers 41 to 44 is greater than a maximum width in a direction perpendicular to the central line of each of the small chambers 41 to 44. The small chambers 41 to 44 individually communicate with the pass-through ports 8 or 9 of the duct 5 at the upper parts of the small chambers 41 to 44, and the lower ends thereof reach a lower side of the bag 40.

The small chambers 45A, 45B and 45C individually communicate with the pass-through port 8 or 9 at the respective upper parts of the small chambers 45A, 45B and 45C.

The bag 40 is provided with a bent part 46 at the upper part at the side of the pass-through port 9 for downwardly in a direction G1 guiding gas which flows in the duct 5.

The other configuration of the bag 40 is the same as that of the bag 1. The same components are referred to by using the same reference numerals.

The bag 50 shown in FIG. 10 includes a small chamber 51 which is not bent, a small chamber 52 disposed so as to surround the small chamber 51, small chambers 53, 54 and 55 which are bent in a C-shape, and a small chamber 56 disposed so as to surround the small chambers 53 to 55.

The length of a gas flowing path at a central line of each of the small chambers 52 to 56 is greater than a maximum width in a direction perpendicular to the central line of each of the small chambers 52 to 56. The small chamber 51 communicates with the small chamber 52, and the small chambers 53 to 55 individually communicate with the small chamber 56. The small chambers 52 and 56 individually communicate with the pass-through port 8 or 9 of the duct 5 at the respective upper parts of the small chambers 52 and 56, and the lower ends thereof reach a lower side of the bag 50.

The bag 50 is provided with a bent part 57 at the upper part at the side of the pass-through port 9, for downwardly in the direction G1 guiding gas which flows in the duct 5.

Other configuration of the bag 50 is the same as that of the bag 1. The same components are referred to by using the same reference numerals.

In the bags 40 and 50 thus formed, gas is not likely to flow out from the small chambers, thereby sufficiently absorbing the impact on the passenger's head.

Since each of the bags 40 and 50 is provided with the bent part 46 or 57, respectively, for guiding the gas flowing in the duct 5, the gas is likely to flow in the direction G1 by being diverted by the bent part 46 or 57, whereby the bag 40 or 50 can quickly expand without being affected by the folding phenomenon.

When the bent parts 46 and 57 are not provided, the gas flowing in a state where the bag is folded flows in a direction G2 and the folding phenomenon is likely to occur. However, the gas which flows in the direction G2 is reduced in the bags 40 and 50 shown in FIGS. 9 and 10, respectively, thereby avoiding the folding phenomenon.

FIG. 11 is a sectional view of a portion of a protection bag according to another embodiment, corresponding to that shown in FIG. 4.

A protection bag 60 shown in FIG. 11 is a curtain bag for three-row seats. The protection bag 60 is formed in the same manner as in the bag 1 shown in FIGS. 1 to 4 such that a passenger-side sheet and an automobile-body-side sheet overlapping each other are sewed with each other by the sewing thread 4, thereby forming chambers between the sheets. The connection may be performed by bonding, welding, or the like instead of seaming by the sewing thread.

The bag 60 includes inflators 10A and 10B at the respective ends of the bag 60. The inflator 10A is connected to a duct 61A, and the inflator 10B is connected to a duct 61B. The ducts 61A and 61B extend along side rails. The duct 61A extends to a position above small chambers 62, 63 and 64 from the side of the inflator 10A. The duct 61B extends from the side of the inflator 10B to a position above small chambers 68, 69 and 70, and then to a position above small chambers 65, 66 and 67.

The ducts 61A and 61B are sealed at respective ends 61a and 61b in the gas-flow directions, and are provided with apertures 60R (60R$_1$ to 60R$_9$) for supplying gas to the small chambers 62, 63, 64, 65, 66, 67, 68, 69 and 70, respectively.

The apertures 60R (60R$_1$ to 60R$_9$) are disposed at the lower sides of the ducts 61A and 61B so as to be positioned above and in the vicinity of respective gas inlets of the small chambers 62 to 70. The gas flowing in the ducts 61A and 61B flows into the small chambers 62 to 70 through the apertures 60R, thereby quickly expanding the small chambers 62 to 70.

The length of each of the small chambers 62, 64, 65, 67, 68 and 69 at a central line is greater than a maximum width in a direction perpendicular to the central line of each of the small chambers 62, 64, 65, 67, 68 and 69, and these small chambers are individually formed substantially in a C-shape, as in the case of the bag 1 shown in FIGS. 1 to 4, whereby the gas in the small chambers is not likely to return to the ducts 61A and 61B. Therefore, the passenger's head is firmly received by the bag 60, thereby sufficiently absorbing the impact.

Figure 16:
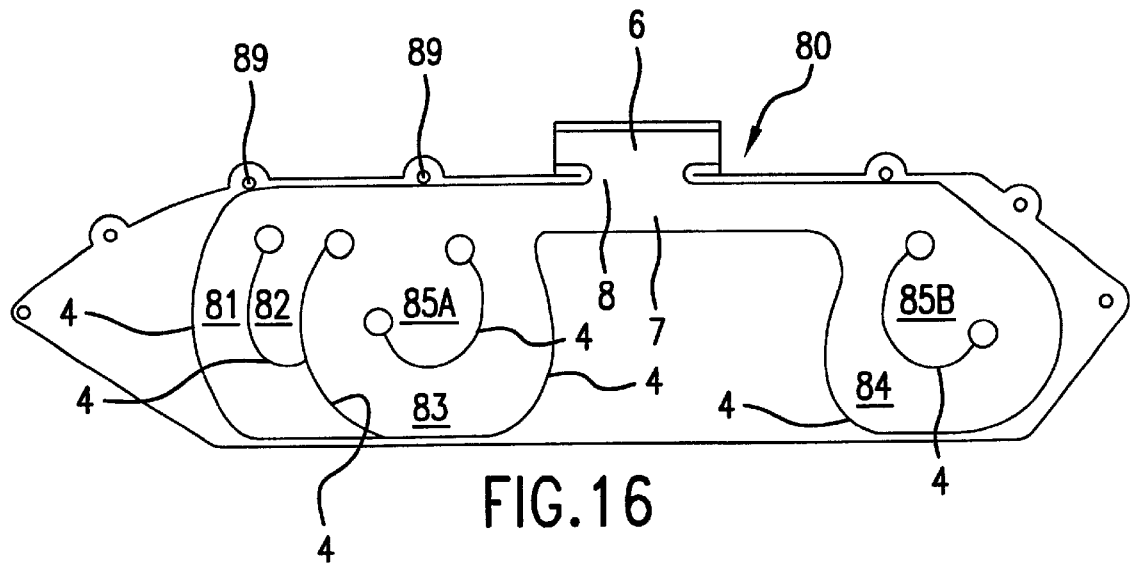
FIG. 16 is a sectional view of a protection bag for a head of an automobile passenger according to a still further embodiment.

FIG. 16 is a sectional view of a portion of a protection bag 80 according to a still further embodiment corresponding to that shown in FIG. 4.

The protection bag 80 includes small chambers 81, 82, 83 an 84 which are bent, and small chambers 85A and 85B which are not bent or curved. The small chambers 83 and 84 are individually bent substantially in an elongated C-shape. The small chamber 83 is disposed so as to surround the small chamber 85A, and the small chamber 84 is disposed so as to surround the small chamber 85B. The small chamber 82 is formed relatively short, and is disposed along an upper half of a side of the small chamber 83. The small chamber 81 is disposed substantially in an arc shape around the small chambers 82 and 83. Respective lower sides of the small chambers 81, 83 and 84 reach a lower side of the bag 80.

The length of each of the small chambers 81 to 84 at the center line is greater than a maximum width in a direction perpendicular to the central line of each of the small chambers 81 to 84. The small chambers 81 to 84, 85A and 85B individually communicate with an introducing chamber 7 at the respective upper parts of the small chambers 81 to 84, 85A and 85B. The introducing chamber 7 communicates with a gas intake 6 via a pass-through port 8. The gas intake 6 extends in the longitudinal direction of the automobile. The gas intake 6 receives an inflator (not shown) or a tube (not shown) connected to the inflator. Gas is ejected toward the pass-through port 8 from the periphery of the inflator or the tube. The gas is introduced to each small chamber through the pass-through port 8 and the introducing chamber 7.

The bag 80 is provided with holes 89 for fixing the bag 80 to the automobile. The other configuration of the bag 80 is the same as that of the bag 1. The same components are referred to by using the same reference numerals.

In the bag 80 thus formed, gas is not likely to flow out from the small chambers, thereby sufficiently absorbing the impact on the passenger's head.

FIGS. 17 and 18(a) are partial-sectional views of protection bags 90 and 90A, respectively, according to other embodiments. The drawings show components corresponding to those shown in FIG. 4. FIG. 18(b) is a perspective view of a hose 98 to be used in the bag 90A.

The bags 90 and 90A respectively include small chambers 91 and 94 bent substantially in a C-shape, small chambers 92 and 93 bent in a J-shape, and small chambers 95, 96 and 97 which are not bent or curved. The small chambers 91 to 94 are individually curved substantially in an arc shape. Particularly, the small chamber 91 is bent substantially in an elongated C-shape.

A duct 5 extends in an upper part of each bag 90 or 90A parallel to the upper side thereof. A gas intake 6 is disposed at an end of each bag 90 or 90A.

The length of a gas flowing path at a central line of each of the small chambers 91 to 94 is greater than a maximum width in a direction perpendicular to the central line of each of the small chambers 91 to 94. The small chambers 91 to 94 individually communicate with the duct 5 at the respective upper parts of the small chambers 91 to 94. The lower parts of the small chambers 91 to 94 reach the lower side of each of the bags 90 and 90A.

The small chambers 95, 96 and 97 which are not bent individually communicate with the duct 5 at the respective upper parts of the small chambers 95, 96 and 97. The small chambers 96 and 97 communicate with the small chambers 92 and 93, respectively, at the respective lower parts of the small chambers 96 and 97.

The duct 5 of the bag 90A shown in FIG. 18(a) receives a cylindrical cloth-hose 98 inserted therein. The hose 98 is provided with orifices 98a, 98b and 98c through which gas is introduced into the small chambers 93, 97 and 94, respectively. The orifices 98a, 98b and 98c face gas inlets of the small chambers 93, 97 and 94, respectively.

The hose 98 is provided with a sewing line 98d in a radial direction at an end of the hose 98, thereby forming a narrow gas outlet 98e. With the narrow gas outlet 98e, it becomes easy to guide the gas in the hose 98 into the small chambers 93, 97 and 94.

The gas intake 6 is connected to a gas generator (cold inflator) containing a high-pressure gas of, for example, 600 kPa.

The bags 90 and 90A are provided with holes 99 for individually fixing the bags 90 and 90A to the automobile. The other configuration of each bag 90 or 90A is the same as that of the bag 1. The same components are referred to by using the same reference numerals.

In the bags 90 and 90A thus formed, gas is not likely to flow out from the small chambers, thereby sufficiently absorbing the impact on the passenger's head.

FIG. 19 is a sectional view of a portion of a protection bag 100 according to yet another embodiment, corresponding to that shown in FIG. 4.

The bag 100 includes small chambers 102 and 105 which are bent or curved substantially in a U-shape, a small chamber 103 which is bent in an S-shape, a small chamber 104 which is bent in a J-shape, and small chambers 101 and 106 which are not bent.

A duct 5 is disposed to extend parallel to the upper side of the bag 100 in an upper part thereof. A gas intake 6 is provided at an end of the bag 100. A pipe (not shown) is inserted into the gas intake 6, and gas is supplied into the bag 100 through the pipe.

The length of a gas flowing path at a central line of each of the small chambers 102 to 105 is greater than a maximum width in a direction perpendicular to the central line of each of the small chambers 102 to 105. The small chambers 102 to 105 individually communicate with the duct 5 at the respective upper parts of the small chambers 102 to 105, and the respective lower parts thereof reach the lower side of the bag 100.

The small chambers 101 and 103, which are not curved, individually communicate with the duct 5 at the respective upper parts of the small chambers 101 and 103. The small chamber 106 communicates with the small chamber 105 at an end of the small chamber 105.

The bag 100 is provided with holes 109 for fixing the bag 100 to the automobile. Numeral 4m denotes a circular sewing line formed at an end of a sewing line of the sewing thread 4 or at a bent part. The other configuration of the bag 100 is the same as that of the bag 1.

In the bag 100, gas is not likely to flow out from the small chambers, thereby sufficiently absorbing the impact on the passenger's head.

FIG. 20 is a sectional view of a portion of a protection bag 110 according to a further embodiment. The portion corresponds to that shown in FIG. 4.

The bag 110 includes small chambers 111, 113 and 114 which are bent or curved substantially in a U-shape, a small chamber 112 which is bent in a J-shape, and small chambers 115 to 118 which are not bent.

A duct 5 is disposed to extend parallel to the upper side of the bag 110 in an upper part thereof. A gas intake 6 is disposed at an end of the bag 110.

The length of a gas flowing path at a central line of each of the small chambers 111 to 114 is greater than a maximum width in a direction crossing the central line of each of the small chambers 111 to 114. The small chambers 111 to 114 individually communicate with the duct 5 at the respective upper parts of the small chambers 111 to 114, and the respective lower parts thereof reach the lower side of the bag 110.

The small chambers 115 to 118 which are not bent or curved individually communicate with the duct 5 at the respective upper parts of the small chambers 115 to 118.

The bag 110 is provided with holes 119 for fixing the bag 110 to the automobile. Numerals 4m denote circular sewing lines formed at ends of the sewing lines of the sewing threads 4. The other configuration of the bag 110 is the same as that of the bag 1.

In the bag 110, gas is not likely to flow out from the small chambers, thereby sufficiently absorbing the impact on the passenger's head.

FIG. 21 is a sectional view of a portion of a protection bag 120 according to a still further embodiment. The portion corresponds to that shown in FIG. 4.

The bag 120 includes small chambers 121, 122, 123 and 124 which are bent or curved substantially in a U-shape, and small chambers 126 and 127 which are not bent. The small chambers 123 and 124 communicate with each other at the respective lower parts thereof via a path 125, whereby a U-shaped small chamber is formed with the right half of the small chamber 123, the left half of the small chamber 124, and the path 125.

A duct 5 is disposed to extend parallel to the upper side of the bag 120 in an upper part thereof. A gas intake 6 is disposed at an end of the bag 120.

The length of a gas flowing path at a central line of each of the small chambers 121 to 124 is greater than the maximum width in a direction perpendicular to the central line of each of the small chambers 121 to 124. The small chambers 121 to 124 individually communicate with the duct 5 at the respective upper parts of the small chambers 121 to 124, and the respective lower parts thereof reach the lower side of the bag 120.

The small chambers 126 and 127 individually communicate with the duct 5 at the upper parts thereof.

The bag 120 is provided with holes 129 for fixing the bag 120 to the automobile. Numerals 4m denote circular sewing lines formed at ends of the sewing lines of sewing threads 4. The other configuration of the bag 120 is the same as that of the bag 1.

In the bag 120, gas is not likely to flow out from the small chambers, thereby sufficiently absorbing the impact on the passenger's head.

The small chambers 52 and 56 of the bag 50 shown in FIG. 10, the small chamber 111 of the bag 110 shown in FIG. 20, and the lower parts of the small chambers 121, 122, 123 and 124 and the path 125 of the bag 120 shown in FIG. 21 individually form substantially horizontal extending or elongated members in the bags 50, 110 and 120, respectively, which extend in the longitudinal direction along the lower sides of the bags 50, 110 and 120, respectively. When the extending member inflates and spreads between the pillars of the automobile, the extending member is supported by the pillars at both ends thereof, so that the extending member is not likely to be bent at a vertically intermediate portion thereof. Therefore, the passenger's head is efficiently received by the inflated extending member when the passenger collides with the extending member at the head.

The above-described embodiments are examples of the present invention, and the present invention may have other arrangements. For example, the inflator may be disposed at the A-pillar side, or be disposed between the A-pillar and the B-pillar. The small chamber may be formed in a shape other than those shown in the drawings. FIGS. 12(a) to 12(h) show small chambers respectively formed in a J-shape. FIGS. 13(a) to 13(d) show the small chambers respectively formed in a C-shape. FIGS. 14(a) to 14(d) show the small chambers formed in a U-shape. FIGS. 15(a) to 15(h) show the small chambers formed in an S-shape.

In the above-described embodiments, for example, in the bag shown in FIG. 4, the intake capacity of gas between the small chambers 11 and 12 and the small chambers 13 and 14 differs from each other. The two sets of the small chambers are preferably equally inflated and are simultaneously expanded without reducing or sacrificing the speed of expansion of one set of the small chambers with respect to that of the other set.

Therefore, the sizes of apertures or the widths of portions not sewed of the pass-through ports 8 and 9 as gas-supply ports are changed so that gas is supplied into the two sets of small chambers in different amounts to thereby control the expansion of the two sets of the small chambers to become substantially simultaneously. Particularly, since the intake capacity of the gas of the small chambers 13 and 14 is greater than that of the small chambers 11 and 12, the size of aperture or the width of a portion not sewed of the pass-through port 9 is set larger than that of the pass-through port 8. Namely, the design is made while considering the balance of expansion.

In the embodiment shown in FIG. 8, the above-described effect can be obtained by controlling the widths of the ducts 31A and 32A other than the sizes of apertures or the widths of the portions not sewed of the pass-through ports 8 and 9.

As described above, according to the present invention, the impact on the head of the automobile passenger can be sufficiently absorbed by increasing the amount of the gas to be supplied into the small chambers and reducing the amount of the gas flowing out of the small chambers.

According to the present invention, bending of the bag during the inflation of the bag can be avoided and the whole of the bag can be quickly inflated.

While the invention has been explained with reference to the specific embodiments of the invention, the explanation is illustrative and the invention is limited only by the appended claims.

What is claimed is:

1. A protection bag for protecting a head of an automobile passenger disposed in an area between a ceiling and a side face of an automobile, comprising:

a main bag section extending downwardly along a side face of an automobile upon introduction of a gas, and having a gas inlet section, and a plurality of small chambers formed in the main bag section and communicating with the gas inlet section to be inflated by gas introduced therein, at least one of the small chambers being curved along a direction of flow of the gas and having a spiral shape so that a part of said at least one small chamber is located adjacent to another part of said at least one small chamber through a partition for forming the spiral shape.

2. A protection bag for protecting a head of an automobile passenger according to claim 1, wherein the small chamber which is curved includes two ends, and at least one gas inlet formed at one of the two ends, said direction of flow of the gas extending along a central line between said two ends through intermediate points in a lateral direction of the small chamber.

3. A protection bag for protecting a head of an automobile passenger according to claim 2, wherein the length of the central line between the two ends is greater than a maximum width of the small chamber in a direction perpendicular to the central line and a tangent to the central line.

4. A protection bag for protecting a head of an automobile passenger according to claim 1, wherein the at least are small chamber is formed with a passenger-side sheet and an automobile-body-side sheet connected to each other by a connection line, said connection line being disposed to surround a centripetal point of the spiral.

5. A protection bag for protecting a head of an automobile passenger according to claim 4, wherein said partition is formed by parts of the passenger-side sheet and the automobile-body-side sheet connected by the connection line.

6. A protection bag for protecting a head of an automobile passenger according to claim 1, wherein said small chamber with the spiral shape includes a gas-introducing part at an inner part thereof for introducing gas therethrough.

7. A protection bag for protecting a head of an automobile passenger according to claim 6, further comprising a duct provided along an upper side of the main bag section for introducing the gas from an inflator and having a pass-through port for ejecting the gas, said gas-introducing part provided at the inner part of the spiral small chamber being positioned near the pass-through port.

8. A protection bag for protecting a head of an automobile passenger according to claim 1, wherein a cross-sectional area of a gas-flowing path connected to a gas inlet of each small chamber is set so that expansion speeds of the small chambers are substantially same.

9. A protection apparatus for protecting a head of an automobile passenger, comprising:

a protection bag as defined in claim 1; and a gas generator for supplying the gas into the protection bag.

10. A protection bag for protecting a head of an automobile passenger according to claim 1, wherein two small chambers in the spiral shape are located adjacent to each other along a longitudinal direction of the automobile, said two small chambers having inlets situated adjacent to each other.

11. A protection bag for protecting a head of an automobile passenger according to claim 1, wherein said at least one small chamber in the spiral shape includes two ends, one end communicating with the gas inlet section and the other end being a closed end located at an inner part of the small chamber.

* * * * *